US012044449B2

(12) United States Patent
Siegersma et al.

(10) Patent No.: US 12,044,449 B2
(45) Date of Patent: Jul. 23, 2024

(54) REFRIGERANT COMPRESSOR WITH WEAR SLEEVE AND LUBRICANT BLENDS FOR HANDLING DEBRIS-LADEN FLUIDS

(71) Applicant: TRANE INTERNATIONAL INC., Davidson, NC (US)

(72) Inventors: Michael T. Siegersma, West Salem, WI (US); Daniel A. Strange, La Crosse, WI (US); Russell T. Abbott, Caledonia, MN (US); Todd W. Smith, Onalaska, WI (US); Elyse M. Sorenson, Stoddard, WI (US); Morgan Elizabeth Herried Leehey, La Crosse, WI (US); Curtis E. Everson, La Crosse, WI (US); Mohammad Akram, Rosemount, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 99 days.

(21) Appl. No.: 17/804,786

(22) Filed: May 31, 2022

(65) Prior Publication Data

US 2023/0384002 A1 Nov. 30, 2023

(51) Int. Cl.
*F25B 31/00* (2006.01)
*C10M 101/00* (2006.01)
(Continued)

(52) U.S. Cl.
CPC ......... *F25B 31/002* (2013.01); *C10M 101/00* (2013.01); *C10M 105/06* (2013.01);
(Continued)

(58) Field of Classification Search
CPC .............................. F25B 31/002; F25B 31/026
See application file for complete search history.

(56) References Cited

U.S. PATENT DOCUMENTS

| 2,048,578 A | 7/1936 | Van Der Host |
| 5,346,316 A | 9/1994 | Okada et al. |

(Continued)

FOREIGN PATENT DOCUMENTS

| CN | 100516530 C | 7/2009 |
| CN | 203114905 U | 8/2013 |
| CN | 105755511 B | 2/2018 |

OTHER PUBLICATIONS

Extended European Search Report; European Patent Application No. 23176379.8, Oct. 10, 2023 (10 pages).

*Primary Examiner* — Ellen M McAvoy
(74) *Attorney, Agent, or Firm* — HSML P.C.

(57) ABSTRACT

A compressor including a housing, a shaft configured to be rotated relative to the housing to compress a refrigerant, a motor configured to drive the shaft, a lubrication system configured to supply lubricant to the compressor, and a bearing configured to support the shaft. The shaft includes a wear-resistant sleeve-like treatment on at least a portion of an outer surface of the shaft adjacent the bearing. The lubricant is a lubricant blend composition that includes two or more lubricants, the two or more lubricants including a first lubricant and a second lubricant. The first lubricant is present at a higher volume percentage than the second lubricant, and the first lubricant includes a higher viscosity than the second lubricant.

16 Claims, 5 Drawing Sheets

(51) Int. Cl.

| | | |
|---|---|---|
| *C10M 105/06* | (2006.01) | |
| *C10M 105/38* | (2006.01) | |
| *C10M 107/24* | (2006.01) | |
| *C10M 111/04* | (2006.01) | |
| *C10M 129/10* | (2006.01) | |
| *C10M 129/18* | (2006.01) | |
| *C10M 133/46* | (2006.01) | |
| *C10M 137/04* | (2006.01) | |
| *C10M 141/10* | (2006.01) | |
| *C10M 169/04* | (2006.01) | |
| *F25B 31/02* | (2006.01) | |
| *C10N 30/02* | (2006.01) | |
| *C10N 30/06* | (2006.01) | |
| *C10N 30/10* | (2006.01) | |
| *C10N 30/12* | (2006.01) | |
| *C10N 40/30* | (2006.01) | |

(52) U.S. Cl.
CPC ........ *C10M 105/38* (2013.01); *C10M 107/24* (2013.01); *C10M 111/04* (2013.01); *C10M 129/10* (2013.01); *C10M 129/18* (2013.01); *C10M 133/46* (2013.01); *C10M 137/04* (2013.01); *C10M 141/10* (2013.01); *C10M 169/04* (2013.01); *F25B 31/026* (2013.01); C10M 2203/065 (2013.01); C10M 2203/1006 (2013.01); C10M 2207/023 (2013.01); C10M 2207/042 (2013.01); *C10M 2207/2835* (2013.01); *C10M 2209/043* (2013.01); *C10M 2215/30* (2013.01); *C10M 2223/041* (2013.01); *C10N 2030/02* (2013.01); *C10N 2030/06* (2013.01); *C10N 2030/10* (2013.01); *C10N 2030/12* (2013.01); *C10N 2040/30* (2013.01)

(56) References Cited

U.S. PATENT DOCUMENTS

| | | |
|---|---|---|
| 8,528,913 B2 | 9/2013 | Eggert et al. |
| 10,612,825 B2 | 4/2020 | Majurin et al. |
| 2005/0201864 A1 | 9/2005 | Yoshida et al. |
| 2007/0099027 A1* | 5/2007 | Krishnamurthy ..... C23C 28/341 428/698 |
| 2012/0227389 A1 | 9/2012 | Hinderks |
| 2014/0294643 A1* | 10/2014 | Koyama ............. F04C 29/0057 418/55.5 |
| 2015/0377533 A1* | 12/2015 | Harkins ................ C09K 5/045 62/529 |
| 2017/0328618 A1* | 11/2017 | Majurin ................. F25B 45/00 |
| 2018/0097419 A1* | 4/2018 | Suzuki ................... H02K 3/522 |
| 2020/0166250 A1* | 5/2020 | Mannewitz ........... F04B 39/128 |
| 2020/0408245 A1* | 12/2020 | Jeung ...................... F16C 33/26 |
| 2022/0178593 A1* | 6/2022 | Thornton ............... H02K 5/203 |
| 2023/0213040 A1* | 7/2023 | Harrison ................. F25B 7/00 184/6.16 |

* cited by examiner

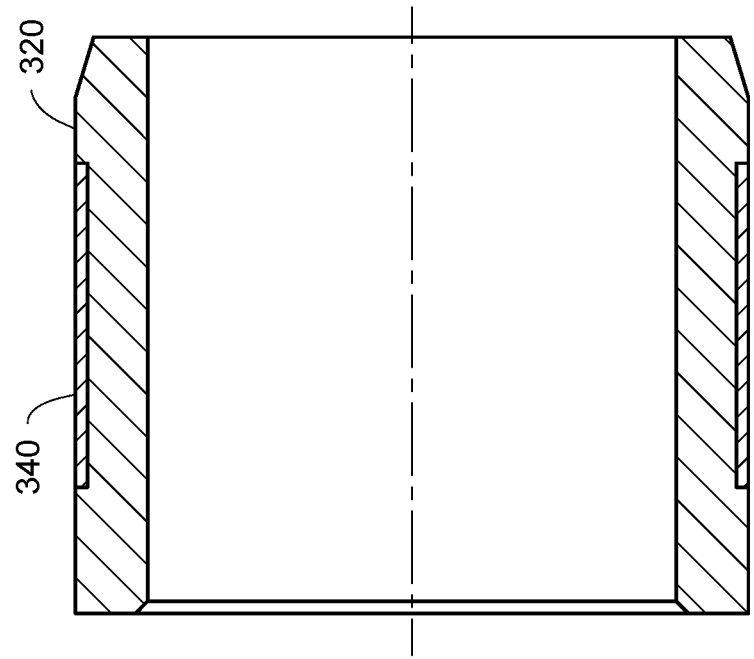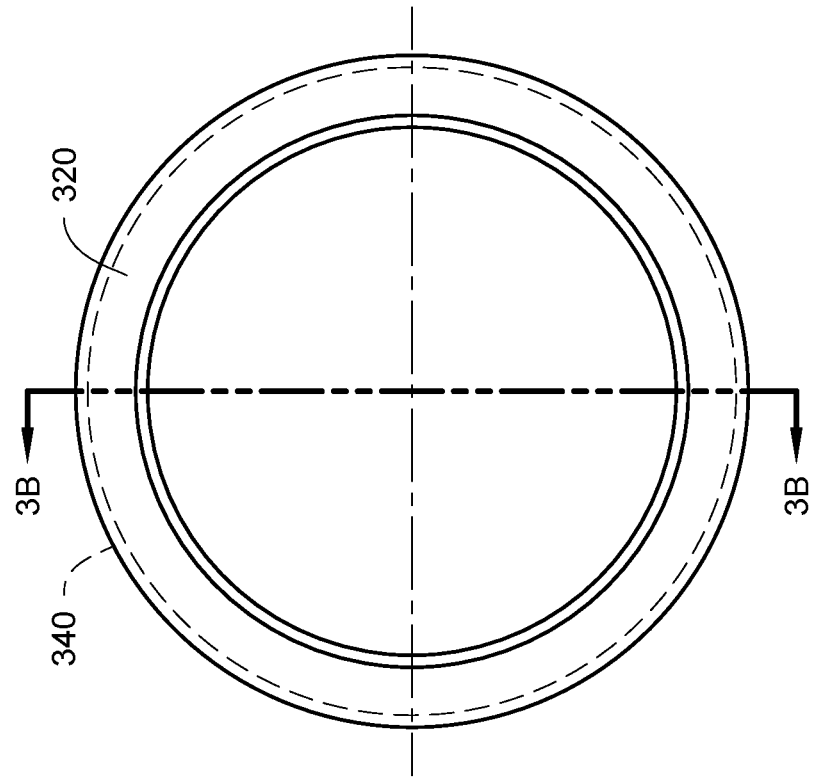

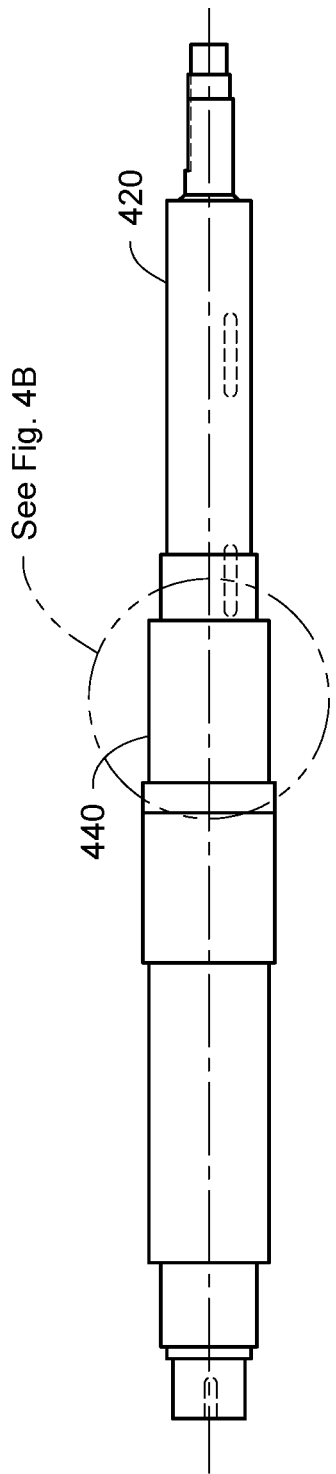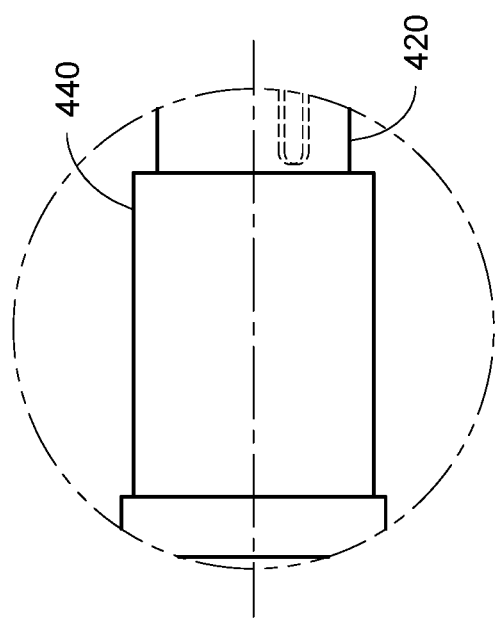
Fig. 4A
Fig. 4B

REFRIGERANT COMPRESSOR WITH WEAR SLEEVE AND LUBRICANT BLENDS FOR HANDLING DEBRIS-LADEN FLUIDS

FIELD

Embodiments disclosed herein generally relate to compressors, pumps, and expansion engines with shaft wear sleeves, improved lubricant film thickness, and/or lubricant with additives for handling debris-laden fluids. In particular, compositions, methods, systems, and applications herein are directed to reducing and/or eliminating wear between moving parts in compressors, pumps, and expansion engines, which may be implemented in equipment of vapor compression systems, such as, for example, heating, ventilation, air conditioning, and/or refrigeration (HVACR) systems.

BACKGROUND

HVACR systems are generally used to heat, cool, and/or ventilate an enclosed space (e.g., an interior space of a commercial building or a residential building, an interior space of a refrigerated transport unit, or the like). A HVACR system may include a heat transfer circuit that utilizes a working fluid for providing cooled or heated air to an area. The heat transfer circuit includes a compressor.

The compressors include parts (e.g., driveshaft, scroll, rotor, screws, impeller, and the like) configured to move to compress a working fluid. The compressor can include one or more bearing(s) that include surfaces (e.g., a moving surface and a non-moving surface, or the like) that slide against each other to allow movement, for example, for supporting the rotating shaft within the compressor. A bearing can provide support while allowing a moving component to move relative to the housing of the compressor. Lubricant (e.g., oil or the like) can be supplied to the bearing(s) to prevent wear between the surfaces of the bearings. Seals can also be provided along the rotating shaft to prevent leakage of the working fluid between different stages, e.g., high and low stages, of the compressor, for example, a labyrinth seal.

The lubricants are used on these load bearing surfaces to reduce friction and wear. For example, in HVACR systems, utilizing saturated and unsaturated hydrofluorocarbon (HFC) refrigerants—also referred to as hydrofluoroolefins (HFOs) when unsaturated, may employ a polyol ester (POE) or a polyvinyl ether (PVE) lubricant. A specific lubricant is selected by considering the lubrication requirements of the intended system of use and ensuring that the refrigerant and oil mixture properties meet these requirements.

SUMMARY

Embodiments disclosed herein generally relate to compressors, pumps, and expansion engines with shaft wear sleeves, improved lubricant film thickness, and/or lubricants with additives for handling debris-laden fluids. In particular, compositions, methods, systems, and applications herein are directed to reducing and/or eliminating wear between moving parts in compressors, pumps, and expansion engines, which may be implemented in equipment of vapor compression systems, such as, for example, heating, ventilation, air conditioning, and/or refrigeration (HVACR) systems.

Embodiments disclosed herein generally relate to overcoming the deficiencies of compressors, pumps, and expansion engines, which may be implemented in equipment of vapor compression systems, such as, for example, heating, ventilation, air conditioning, and/or refrigeration (HVACR) systems. In an embodiment, a compressor includes a shaft having a wear-resistant sleeve-like treatment on at least a portion of an outer surface of the shaft adjacent the bearing and/or seal. In another embodiment, the lubricant is a lubricant blend composition comprising two or more lubricants, the two or more lubricants including a first lubricant; and a second lubricant, in which the first lubricant is present at a higher volume percentage than the second lubricant, and the first lubricant includes a higher viscosity than the second lubricant. In yet another embodiment, the lubricant includes additives, in which the additives include at least one of anti-wear additives, corrosion inhibitor additives, antioxidant additives, acid catching additives, or a combination thereof. It is appreciated that while each of the above features were found to mitigate the wearing of the surfaces, it was surprisingly found that at least a combination of two of the above features resulted in unexpectedly improved properties than the features alone, and most preferably, when the compressor included the wear-resistant sleeve-like treatment, e.g., the chromium oxide (ceramic) wear sleeve, along with the use of a higher viscosity oil, e.g., viscosity between at or about 90 centistokes and at or about 100 centistokes at 40° C., and the additives, at the critical ranges discussed herein. That is, it was surprisingly found that such combination of features provided the required protection against system debris and oil breakdown for continued operation of the compressor, e.g., reduced and/or prevented excessive abrasive wear of the system by, for example, permitting intermittent contact with lubricant having small hard particles.

In an embodiment, a compressor is provided. The compressor includes a housing, a shaft configured to be rotated relative to the housing to compress a refrigerant, a motor configured to drive the shaft, a lubrication system configured to supply lubricant to the compressor; and a bearing configured to support the shaft. The shaft comprises a wear-resistant sleeve-like treatment on at least a portion of an outer surface of the shaft adjacent the bearing. The lubricant is a lubricant blend composition comprising two or more lubricants, the two or more lubricants including a first lubricant; and a second lubricant, wherein the first lubricant is present at a higher volume percentage than the second lubricant, and the first lubricant includes a higher viscosity than the second lubricant.

In an embodiment, the wear-resistant sleeve-like treatment is a coating selected from at least one of hard chrome, chromium oxide, aluminum oxide, cobalt/chromium carbide, boron nitride, CoNiCrAlY, NiCoCrAlY, complex carbides in nickel rich matrix, tungsten carbides in cobalt rich matrix (ExoGard), graphite, molybdenum, tungsten, diamond-like carbon, nickel alloy, hardened steel, or a combination thereof.

In an embodiment, the lubricant has a viscosity between at or about 90 centistokes and at or about 100 centistokes at 40° C., and between at or about 12 centistokes and at or about 12.6 centistokes at 100° C.

In an embodiment, the lubricant includes additives, wherein the additives include at least one of anti-wear additives, corrosion inhibitor additives, antioxidant additives, acid catching additives, or a combination thereof.

In an embodiment, the lubricant comprises the anti-wear additives, the corrosion inhibitor additives, the antioxidant additives, and the acid catching additives, wherein the anti-wear additives include triaryl phosphates, the corrosion inhibitor additives include benzotriazole, the antioxidant additives include butylated hydroxytoluene, and the acid catching additives include 2-ethylhexyl glycidyl ether.

In an embodiment, the lubricant comprises between at or about 85 and at or about 95 volume % polyol ester (POE), between at or about 5 and at or about 15 volume % alkylbenzene (AB), and between at or about 1 and at or about 5 mass % additives.

In an embodiment, a method of retrofitting a compressor is provided. The method includes coating a sleeve for a shaft of the compressor to provide a wear-resistant coating. The method further includes interference fitting the sleeve on the shaft of the compressor by heating the sleeve and fitting the sleeve over the shaft.

DRAWINGS

These and other features, aspects, and advantages of the will become better understood when the following detailed description is read with reference to the accompanying drawing, wherein:

FIGS. 3A-3B are a frontal and cross-sectional view of an embodiment of a coating on a sleeve.

FIGS. 4A-4B are a side and enlarged view of an embodiment of a coating on a compressor shaft.

DETAILED DESCRIPTION

Figure 1:
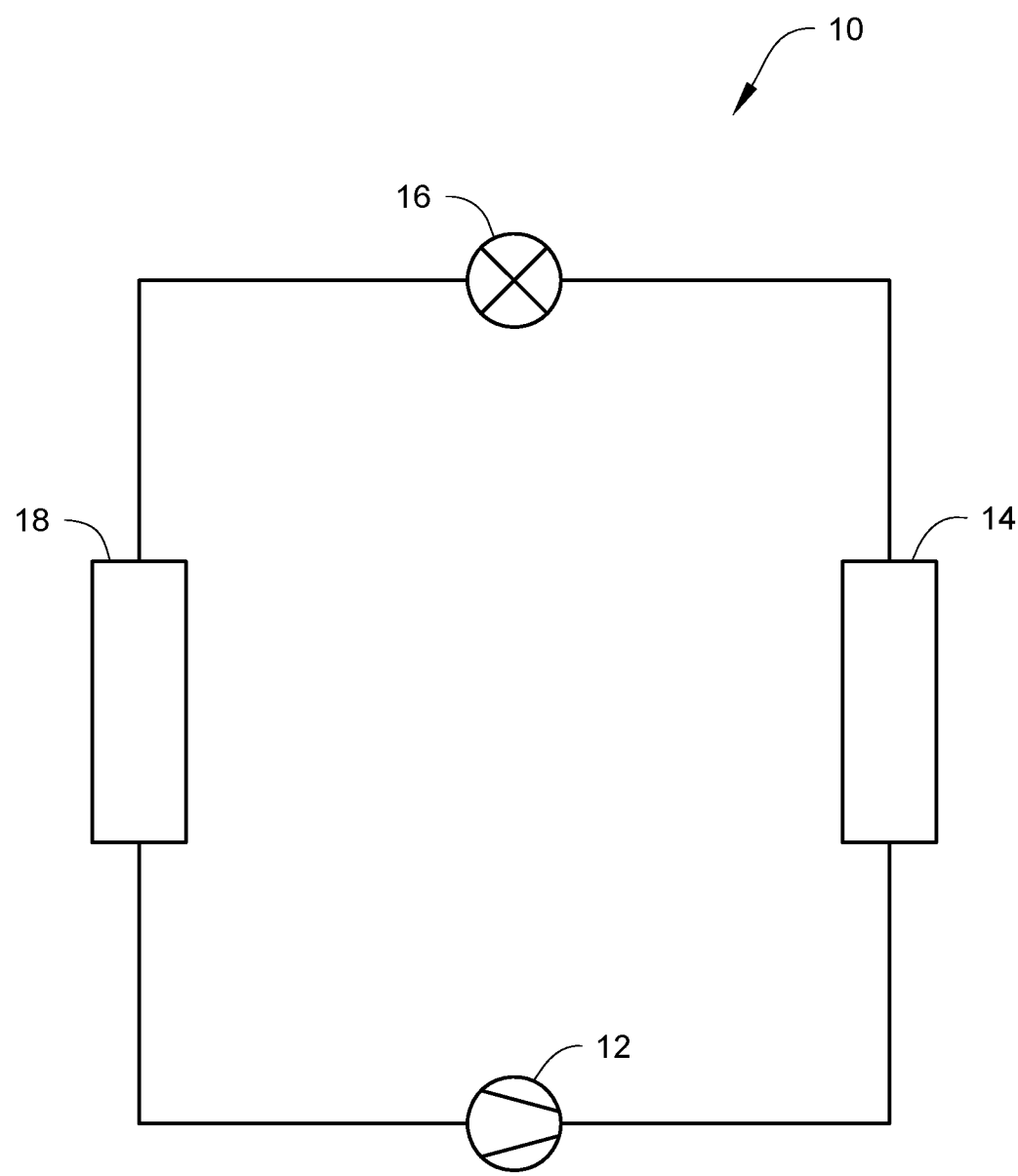
FIG. 1 is a schematic diagram of a vapor compression system, according to an embodiment.

Embodiments disclosed herein generally relate to compressors, pumps, and expansion engines with shaft wear sleeves, improved lubricant film thickness, and/or lubricant including additives for handling debris-laden fluids. In particular, compositions, methods, systems, and applications herein are directed to reducing and/or eliminating wear between moving parts in compressors, pumps, and expansion engines, which may be implemented in equipment of vapor compression systems, such as, for example, heating, ventilation, air conditioning, and/or refrigeration (HVACR) systems.

A HVACR system is generally configured to heat and/or cool an enclosed space (e.g., an interior space of a commercial or residential building, an interior space of a refrigerated transport unit, or the like). The HVACR system includes a heat transfer circuit that includes a compressor and a working fluid (e.g., a refrigerant, a refrigerant mixture, or the like) that circulates through the heat transfer circuit. The working fluid is utilized to heat or cool a process fluid (e.g., air, water and/or glycol, or the like).

The compressor includes components (e.g., driveshaft, scroll, rotor, screws, impeller, and the like) that move relative to the housing of the compressor to compress the working fluid. One or more bearing(s) are provided to support the components within the compressor, in which lubricant is provided to lubricate the moving components and/or provide a sealing film. After being supplied to the bearing(s), the lubricant mixes with additional working fluid, in which the lubricant may lose refrigerant or include additional refrigerant, depending on the temperature and/or pressure conditions in the bearing and/or cavities. The lubricant is separated from the working fluid and the separated lubricant, which may include refrigerant, is then circulated back to the bearing(s). The lubricant can be stored in a lubricant tank until its supplied back to the bearing(s). The working fluid includes refrigerant. New types of low global warming potential (GWP) refrigerants with zero ozone depletion potential, such as R514A refrigerant, R1233zd(E) refrigerant, R1234ze(E) refrigerant, R515B refrigerant, R513A refrigerant, and the like, are more easily dissolved into the lubricant causing the lubricant to be less effective in providing lubrication to the bearing(s).

In such equipment of vapor compression systems, the moving parts are separated from a wearing surface(s) of a moving part and/or a non-moving part by the lubricant. Abrasive wearing can occur when the lubricant is contaminated with small hard particles, e.g., greater than 25 microns and preferably between 25 to 100 microns. The small hard particles can include sheared off welded asperities, spalling, corrosion products, machining chips and debris, sand castings, un-clean assembly processes, oxides from chemical reactions, and/or the like. As such, the small hard particles can become embedded or lodged between the moving parts and the wearing surface(s) and the sliding between the moving part and the wearing surface can experience abrasive wearing due to the presence of these small hard particles, e.g., wire-wooling of the rotating shaft. That is, the small hard particle may be too large to pass the clearance distance between the moving part and be lodged between the rotating shaft and journal bearing, causing the debris to abrade the rotating shaft and/or journal bearing. For example, the thickness of the oil film within the bearing can be 25-50 microns. Particles that are smaller than the thickness may pass through the bearing without contact. Particles larger than this thickness may become embedded therein.

Further, as discussed above, as vapor compression systems are replacing the refrigerants having high global warming potential with refrigerants that are non-ozone depleting and have low global warming potential, new failure mechanisms are being observed due at least in part to the refrigerant being easily dissolved into the lubricant causing the lubricant to be less effective in providing lubrication to the bearing. For example, refrigerants used today and being developed as next generation refrigerants for HVACR equipment are soluble in POE and PVE lubricants, for example in the range of 32 to 120 centistoke (cSt) viscosities, depending on the operation type of the HVACR equipment (e.g. variable or fixed speed operation, compressor type e.g., rotary, screw, centrifugal, and the like). However, these refrigerants can potentially exhibit higher solubility and may be increasingly used in variable or high speed compressor product applications in which the lubricity of the lubricant is not sufficient. As such, newer developed refrigerants may result in corrosion of the wearing surfaces, e.g., between the moving and/or non-moving parts, which can contribute to the generation of the small hard particles which may be carried by the lubricant to cause the premature wear of the wear surface, e.g., between the rotating shaft and/or bearing(s).

Furthermore, due to the use of the POE lubricant, which is compatible with the low GWP refrigerants, more moisture is present than previous lubricant materials. As such, when the rotating shaft, which is made of iron/steel, is exposed to air and to the POE lubricant, the rotating shaft may become corroded, e.g., oxidation, and the corrosion product is carried by the lubricant as the small hard particles.

Additionally, without wishing to be bound by theory, it is understood that refrigerants break down due to heat or chemical reactions and can form corrosive chemicals. As such, the corrosive chemicals can corrode the bearing, for example, the tin in the Babbitt lining, and/or the rotating shaft, for example, carbon steel sleeve (1026, 1045), low alloy steel (4140 material), or steel alloy, and the corrosion product is carried by the lubricant to result in small hard particles trapped between the moving parts, e.g., the rotating shaft and bearing, to cause wearing or wire-wooling of the shaft and/or bearing. The carrying of the small hard particles, e.g., the corrosion product, in the lubricant can also cause further corrosion/abrasion rather than forming a corrosion/tribological film between the surfaces of the moving and/or non-moving parts, e.g., polar oil tends to suspend and carry corrosion products, rather than the products forming and staying on the metallic surfaces to provide a tribological wear surface layer. That is, the corrosion of certain surfaces can reduce the lubricant film thickness, and thus reduce the load carrying capacity of the bearing system which can also lead to elevated temperatures further breaking down the refrigerant.

Additionally, in the presence of moisture and refrigerant breakdown products, the potential exists for tin oxide to form. Tin oxide can potentially lead to small hard particle generation or decreased ability to embed small hard particles, both capable of producing wearing or wire-wooling of the moving and/or non-moving part(s).

On the other hand, the use of the prior refrigerants, e.g., the ozone depleting and/or high GWP refrigerants, with the compatible lubricants, such as mineral oil, in such vapor compression equipment, did not exhibit the same type of failures. For example, moisture content was much lower in the prior lubricants. Moreover, the non-polar nature of the prior lubricants resulted in more stable wear situations since the non-polar lubricant allowed the products to form and stay on the metallic surfaces to provide a tribological wear surface layer.

Embodiments disclosed herein generally relate to overcoming the deficiencies as described above for compressors, pumps, and expansion engines, which may be implemented in equipment of vapor compression systems, such as, for example, heating, ventilation, air conditioning, and/or refrigeration (HVACR) systems. In an embodiment, a compressor includes a shaft having a wear-resistant sleeve-like treatment on at least a portion of an outer surface of the shaft under the bearing and/or seal. In another embodiment, the lubricant is a lubricant blend composition comprising two or more lubricants, the two or more lubricants including a first lubricant; and a second lubricant, in which the first lubricant is present at a higher volume percentage than the second lubricant, and the first lubricant includes a higher viscosity than the second lubricant. In yet another embodiment, the lubricant includes additives, in which the additives include at least one of anti-wear additives, corrosion inhibitor additives, antioxidant additives, acid catching additives, or a combination thereof. It is appreciated that while each of the above features were found to mitigate the wearing of the surfaces, it was surprisingly found that at least a combination of two of the above features resulted in unexpectedly improved properties than one of the features alone, and most preferably, when used with a zero ozone depletion potential and/or low GWP refrigerant and the compressor included the wear-resistant sleeve-like treatment, e.g., the chromium oxide (ceramic) wear sleeve, along with the use of a higher viscosity oil, e.g., working or pure oil viscosity between at or about 90 centistokes and at or about 100 centistokes at 40° C., and nominally 90 cSt at 40° C., and the additives, at the critical ranges discussed herein. That is, the combination of features as discussed herein provides a vapor compression system having a compressor that permits intermittent contact with lubricant having small hard particles to mitigate/reduce or prevent excessive wear of the moving and/or non-moving parts.

FIG. 1 is a schematic diagram of a heat transfer circuit 10 according to an embodiment. The heat transfer circuit 10 is an example of a vapor compression system, which may be implemented as a HVACR system, such as for example a fluid chiller. In an embodiment, the fluid chiller is a centrifugal chiller, including a centrifugal compressor. The heat transfer circuit 10 generally includes a compressor 12, a condenser 14, an expander 16, and an evaporator 18. The heat transfer circuit 10 is exemplary and can be modified to include additional components. For example, in an embodiment the heat transfer circuit 10 can include an economizer heat exchanger, one or more flow control devices, a receiver tank, a dryer, a suction-liquid heat exchanger, or the like. In an embodiment, the heat transfer circuit 10 can include a plurality of compressors 12. In an embodiment, the plurality of compressors 12 can include compressors having different capacities.

The heat transfer circuit 10 can generally be applied in a variety of systems used, for example, to control an environmental condition (e.g., temperature, humidity, air quality, or the like) in a space (generally referred to as a conditioned space). Examples of systems include, but are not limited to, heating, ventilation, air conditioning and refrigeration (HVACR) systems, transport refrigeration systems, or the like.

The components of the heat transfer circuit 10 are fluidly connected. The heat transfer circuit 10 can be specifically configured to be a type of cooling system (e.g., fluid chiller) capable of operating in a cooling mode. Alternatively, the heat transfer circuit 10 can be specifically configured to be a heat pump system which can operate in both a cooling mode and a heating/defrost mode.

Heat transfer circuit 10 operates according to generally known principles. The heat transfer circuit 10 can be configured to use a heat transfer fluid or medium (e.g. working fluid) to heat or cool a process fluid or medium (e.g., a liquid such as, but not limited to, water or the like), in which case the heat transfer circuit 10, in an embodiment, may be generally representative of a fluid chiller system. The heat transfer circuit 10 can alternatively be configured to use a heat transfer fluid or medium (e.g. working fluid) to heat or cool a process medium or fluid (e.g., a gas such as, but not limited to, air or the like), in which case the heat transfer circuit 10 may be generally representative of an air conditioner or heat pump. In an example, the working fluid can be a refrigerant or refrigerant blend.

In operation, the compressor 12 compresses a heat transfer fluid or working fluid (e.g., refrigerant or the like) from a relatively lower pressure gas to a relatively higher-pressure gas. The relatively higher-pressure gas is discharged from the compressor 12 and flows through the condenser 14. In accordance with generally known principles, the heat transfer fluid flows through the condenser 14 and rejects heat to a heat transfer fluid or medium (e.g., water, air, etc.), thereby cooling the heat transfer fluid. The cooled heat transfer fluid, which is now in a liquid form, flows to the expander 16. The expander 16 reduces the pressure of the heat transfer fluid. In an embodiment, the expander may be an expansion valve, expansion plate, expansion vessel, orifice, or the like, or other such types of expansion mechanisms. It should be appreciated that the expander may be any type of expander used in the field for expanding a working fluid to cause the working fluid to decrease in pressure and temperature. As a result, a portion of the heat transfer fluid is converted to a gaseous form. The heat transfer fluid, which is now in a mixed liquid and gaseous form flows to the evaporator 18. The heat transfer fluid flows through the evaporator 18 and absorbs heat from a heat transfer medium (e.g., water, air, etc.), heating the heat transfer fluid, and converting it to a gaseous form. The gaseous heat transfer fluid then returns to the compressor 12. The above-described process continues while the heat transfer circuit is operating, for example, in a cooling mode (e.g., while the compressor 12 is enabled).

Figure 2A:
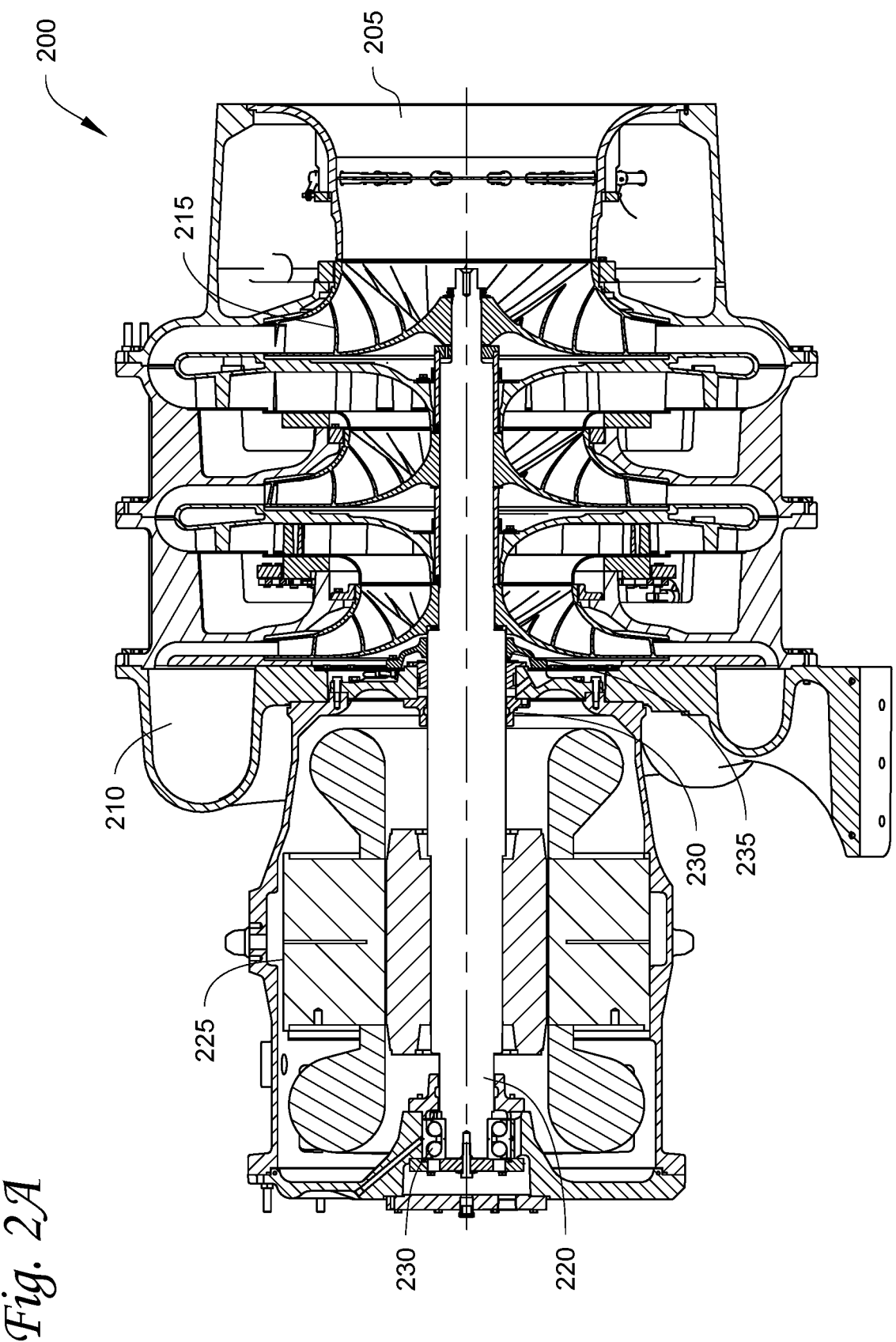
FIG. 2A is a cross-sectional view of a compressor of the vapor compression system of FIG. 1.
Figure 2B:
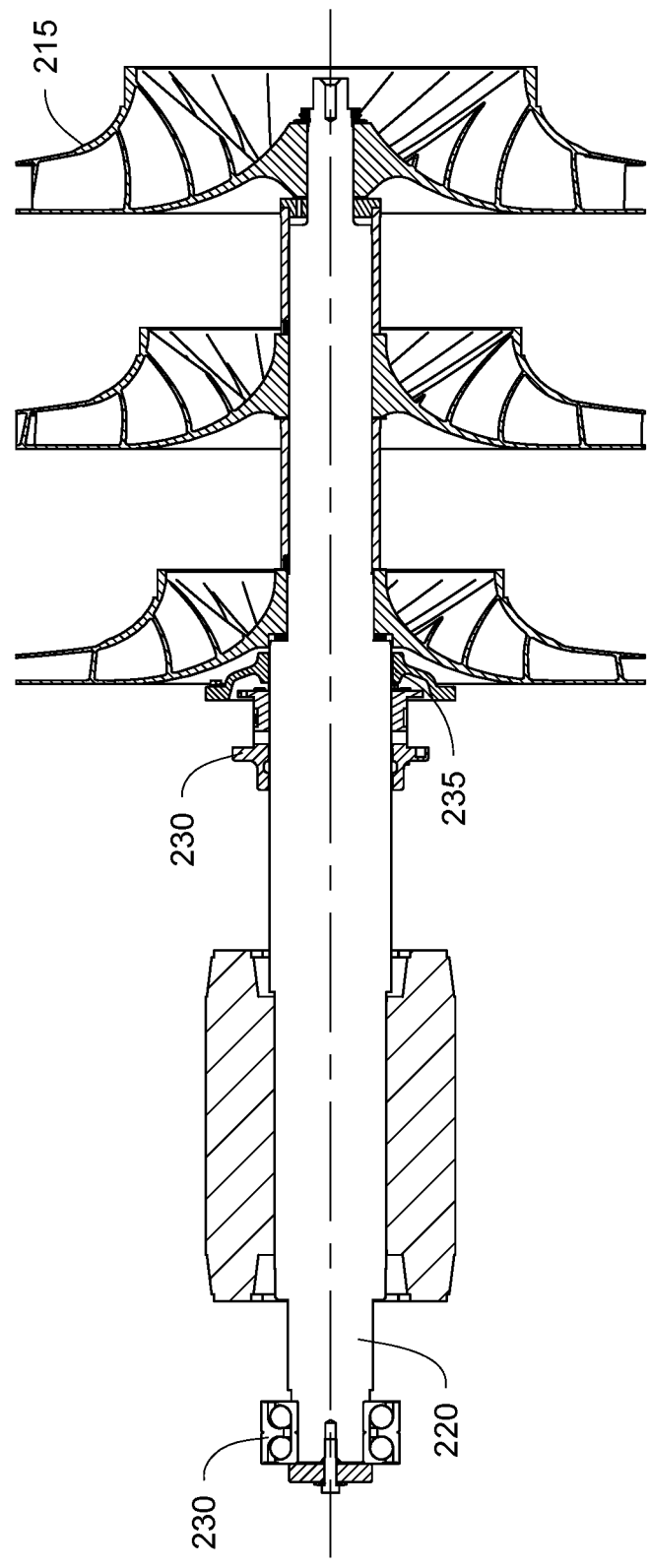
FIG. 2B is a schematic diagram of the compressor shaft and lubricant contact along the compressor shaft.

FIGS. 2A and 2B are a cross-sectional view of an embodiment of a compressor 200 showing the wearing surfaces of the compressor. The compressor 200 can be the compressor 12 in FIG. 1. As such, as similarly discussed for the compressor 12 in FIG. 1, the compressor 200 is part of a heat transfer circuit in an HVACR system (e.g., heat transfer circuit 10, etc.) that compresses a working fluid to provide heating and/or cooling. In an embodiment, the compressor 200 is a centrifugal compressor.

As seen in FIG. 2A, the compressor 200 includes a suction inlet 205, a discharge outlet 210, a compression mechanism 215, such as, impellers or a series or stages of impellers, a compressor shaft 220, a motor 225, one or more bearings 230, such as, thrust bearings, journal bearings, or a combination thereof, and/or seals, such as labyrinth seals 235.

Refrigerant enters the compressor 200 through the suction inlet 205, is compressed by the compression mechanism 215, and the compressed refrigerant is discharged from the discharge outlet 210 of the compressor 200. The bearing(s) 230 provide support to moving parts (e.g., rotating components) of the compressor while allowing the moving parts to move. In an embodiment, the bearings 230 can be radial bearings. However, in another embodiment the bearing(s) supplied lubricant can be thrust bearings. It should be appreciated that the bearing(s) 230 in an embodiment may be a different type of bearing (e.g., a thrust bearing, or the like). Seals 235 can be provided along the rotating shaft to prevent leakage of the working fluid between different stages, e.g., high and low stages, of the compressor and/or between the motor and the compression stages, for example, a labyrinth seal. It is appreciated that FIG. 2A is an example, and the compressor 200 can be a single stage, two-stage, multi-stage compressor.

The lubricant supply system is configured to provide lubricant to lubricate the compressor 200. The lubricant supply system at least supplies lubricant to the one or more moving parts of the compressor 200 (e.g., bearing, scrolls, rotors, impellers etc.). In the illustrated embodiment, the supply system supplies lubricant to at least one of the following components, compressor shaft 220, bearing(s) 230, seals 235, impellers 215, or a combination thereof.

The working fluid circulating in the heat transfer circuit 10 and that is compressed by the compressor 200 includes a refrigerant (e.g., a single refrigerant, a refrigerant blend, or the like). In an embodiment, the refrigerant is a low GWP refrigerant such as R513A refrigerant, R514A refrigerant, R515B refrigerant, R1233zd(E) refrigerant, and/or R1234ze(E) refrigerant, and the like (e.g., having a GWP of less than 750, having a GWP of less than 600). During operation, the working fluid can be combined with the lubricant to provide sealing and lubrication to the moving parts.

As seen in FIG. 2B, the compressor shaft 220 is exposed to at least the refrigerant, the lubricant, or a combination thereof along the length of the compressor shaft between at least one of the bearings 230 or seals 235, or a combination thereof. At the contact areas or points, the compressor shaft 220 can be exposed to a mixture of the refrigerant and lubricant to provide lubrication, e.g., between the moving parts and/or non-moving parts.

As discussed above, when using certain low GWP refrigerants and lubricants that contains a mixture of POE and AB, it was observed that small hard particles from sheared off welded asperities, spalling, corrosion products, machining tools, machining processes, sand castings, un-clean assembly processes, oxides from chemical reactions, and/or the like, were carried by the lubricant and became lodged between the wear surfaces, e.g., bearings or shaft seals, and the compressor shaft 220. As such, small hard particles started to wear the compressor shaft 220 and/or bearing 230 or seal 235, e.g., acted as a cutting tool and machined away the components.

Various embodiments as discussed below were found to overcome these deficiencies of premature wear, e.g., wearing of the moving and non-moving parts due to lubricant having small hard particles. For example, a wear-resistant sleeve-like coating can be applied to the compressor shaft to increase shaft hardness and improve resistance to chemical reactions, or the working or pure oil viscosity of the lubricant can be between to about 70 and to about 100 cSt, and most preferably between to about 90 to about 100 cSt at 40° C., and nominally 90 cSt at 40° C., to improve operating film thickness, or specific additives can be added to the lubricant to reduce wear and chemical reactions. While the embodiments are discussed separately, it is appreciated that the combination of at least two of the features resulted in the unexpected improvement to the properties of the compressor with respect to the abrasive wear.

In an embodiment, as seen in FIGS. 3A-3B, a wear-resistant sleeve-like treatment is included on the compressor shaft 320. The compressor shaft 320 can be used in the compressor 12 or 200 in FIG. 1 or 2A with all low GWP refrigerants. Specifically, the wear-resistant sleeve-like treatment can be selectively applied to certain portions of the compressor shaft 320. For example, due to abrasive wear likely occurring between the compressor shaft 320 and the journal bearing 230 or labyrinth seal 235, the wear-resistant sleeve-like treatment can be applied only to the portion of the compressor shaft that is in direct contact with the same to at least increase shaft hardness and improve resistance to chemical reactions to allow at least some intermittent contact with and/or prevent generation of the small hard particles. In some embodiments the portion can be the entirety of the shaft. The design of the wear-resistant sleeve-like treatment is based on a number of criteria, including, but not limited to, ability to meet surface finish requirements, ability to maintain press-fit, porosity and interaction with compressor parts materials, e.g., babbitt material and aluminum shaft seals, adhesion of coating, e.g., ceramic, to a carbon steel shaft, maintaining sufficient rotordynamic margin, coating cracking during sleeve heating, insertion, and cooling, and the like.

It is appreciated that the wear-resistant sleeve-like treatment, as used herein is not limited to a sleeve with a coating, but can be a number of different applications to increase surface hardness of the compressor shaft, including, but not limited to, a coating on at least a portion of the compressor shaft, a surface treatment on at least a portion of the compressor shaft, a sleeve that is fitted on the compressor shaft, or the like. The coating can be applied in a number of different manners. For example, the coating can be applied using plasma spraying, chemical vapor deposition, thermal spraying, electrodeposition, dip coating, or a combination thereof or similar application that provides bonding of the coating layer to the substrate.

In an embodiment, the wear-resistant sleeve-like treatment can be retrofitted to a compressor shaft, for example, installed at a customer site, or provided during manufacturing of the compressor, e.g., selected portions of the compressor shaft are provided with the wear-resistant sleeve-like treatment.

For example, in an embodiment, as seen in FIG. 3B, the wear-resistant sleeve-like treatment 340 is a sleeve that has been machined for an interference fit with the compressor shaft. The sleeve can be a carbon steel sleeve (1026, 1045), low alloy steel (4140 material), steel alloy, hard plastic, or the like. The sleeve is then treated, for example, spray coated, with a coating selected from at least one of hard chrome, chromium oxide, aluminum oxide, cobalt/chromium carbide, boron nitride, CoNiCrAlY, NiCoCrAlY, complex carbides in nickel rich matrix, tungsten carbides in cobalt rich matrix (ExoGard), graphite, molybdenum, tungsten, diamond-like carbon, nickel alloy, hardened steel, or a combination thereof. Preferably, the coating is a hard chrome or chromium oxide coating, and most preferably, the coating is a chromium oxide coating. In an embodiment, the wear-resistant sleeve-like treatment has a hardness between at or about 60 and at or about 90 HRC.

In an embodiment, the sleeve can have a wall thickness between at or about 0.2 inches and at or about 0.7 inches, and preferably, less than at or about 0.5 inches, and most preferably 0.23 inches for being interference fitted on the compressor shaft. The coating on the sleeve can have a thickness between at or about 0.005 and at or about 0.05 inches, and preferably at or about 0.015 inches. It is understood that the term "about" references design tolerances, manufacturer variances, measurement variance, or the like, as used herein.

In an embodiment, the wear-resistant sleeve-like treatment is retrofitted to a compressor by shrink fitting the wear-resistant sleeve-like treatment onto the compressor shaft to reduce overall cost and design impact. Specific portions of the compressor shaft are selected that are likely to experience abrasive wear, for example, areas of the compressor shaft under the journal bearing and/or inboard and outboard labyrinth seals. The specific portions of the compressor shaft can be treated, for example, ground, chemical or laser etching, or the like to remove a portion of the outer surface of the compressor shaft to receive the sleeve of the wear-resistant sleeve-like treatment.

It is appreciated that by applying the coating on the sleeve to form the wear-resistant sleeve-like treatment 340, the coating layer, for example, the chromium oxide coating, will reduce and/or eliminate shaft wear when contacting the small particle debris since the wear-resistant sleeve-like treatment provides durability against wear and is resistant to chemical reactions.

In an embodiment, as seen in FIGS. 4A-4B, the coating is not applied to a sleeve prior to being installed on the compressor shaft, but rather, the coating can be applied directly on the compressor shaft. For example, the coating locations on the compressor shaft can be determined after observing bearing wear in related vapor compression systems and applied to mitigate and/or eliminate bearing wear. It is appreciated that such coating can be applied to the compressor shaft after installation at a customer site or prior to delivering to a customer site.

As seen in FIGS. 4A-4B, a portion 440 of the compressor shaft 420 is selected that corresponds to the journal bearing and/or labyrinth seal of the compressor in which the compressor shaft 420 is in rotational communication with the same. As discussed above, since along this portion, the lubricant can include small hard particles that can abrasively wear the compressor shaft 420 and/or the journal bearing and/or labyrinth seal, this portion 440 is selected to be hardened with the coating. The compressor shaft 420 can be treated before applying the coating, for example, grinding, etching, or the like to remove a portion thereof to receive the coating layer.

Similar to the embodiment shown in FIGS. 3A-3B, the coating can be selected from at least one of hard chrome, chromium oxide, aluminum oxide, cobalt/chromium carbide, boron nitride, CoNiCrAlY, NiCoCrAlY, complex carbides in nickel rich matrix, tungsten carbides in cobalt rich matrix (ExoGard), graphite, molybdenum, tungsten, diamond-like carbon, nickel alloy, hardened steel, or a combination thereof. Preferably, the coating is a hard chrome or chromium oxide coating, and most preferably, the coating is a chromium oxide coating. In an embodiment, the wear-resistant sleeve-like treatment has a hardness between at or about 60 and at or about 90 HRC. In an embodiment, the coating has a layer between at or about 0.005 and at or about 0.05 inches, and preferably at or about 0.015 inches.

In another embodiment to reduce and/or eliminate wear, a lubricant that is a lubricant blend is provided in the vapor compression system. In particular, compositions, methods, systems, and applications herein are directed to lubricant blends that balance solubility and viscosity of a low GWP refrigerant, where in some cases the lubricant blends herein help reduce solubility of a refrigerant and increase viscosity of the lubricant.

It is appreciated that the lubricity (e.g. lubrication quality) can be impacted when the viscosity is too low, for example through insufficient bearing film thickness in the compressor which can lead to system wear, reduced system life, and/or system failure. Too high of viscosity can impact efficiency of the system through increased power consumption to move the fluid. Targeting a suitable resulting viscosity from lubricant blend can provide adequate viscosity to create an acceptable film when mixed with refrigerant, for example in a chiller system. That is, the solubility of the refrigerant is not detrimental to the viscosity to provide an acceptable bearing film thickness.

In an embodiment, a lubricant blend includes a mixture of two or more different types of lubricants to reduce refrigerant solubility. In an embodiment, the lubricant blend includes one or more of polyol ester (POE), a polyvinyl ether (PVE), and polyalkylene glycol (PAG) as the first lubricant and one or more of alkylbenzene (AB), polyalphaolefin (PAO), mineral oil, and estolide as the second lubricant. In an embodiment, the first lubricant is POE and the second lubricant is AB.

In an embodiment, a POE includes but is not limited to for example a compound which may be derived from alcohols including pentaerythritol, trimethylolpropane, neopentyl glycol, and dipentaerythritol (or combinations), and carboxylic acids comprised of 4 to 10 carbons in linear or branched formation or mixed (both linear and branched).

In an embodiment, a PVE includes but is not limited to for example polymers that contain ether side chains comprised of 2-8 carbons.

In an embodiment, an AB includes but is not limited to for example alkylbenzenes which are branched, linear, or are combinations thereof.

In an embodiment, a mineral oil (MO) includes but is not limited to for example paraffins, naphthenes, aromatics, nonhydrocarbons, or combinations thereof.

In an embodiment, lubricant blend has a resulting ISO viscosity for example at 40° C. of at or about 70 to at or about 100 cSt. In an embodiment, the lubricant blend is used in a system implemented with rotary, screw, scroll compressor, or a centrifugal compressor, which may operate at variable or fixed speed.

In an embodiment, the lubricant blend was selected to increase the operating viscosity to form the bearing film at the required thickness to prevent premature wear between the moving parts. Specifically, the lubricant blend includes by volume of the lubricant at or about 85 to at or about 95 percent by volume of the first lubricant and at or about 5 to at or about 15 percent by volume of the second lubricant, and preferably at or about 90 percent by volume of the first lubricant and at or about 10 percent by volume of the second lubricant. It was surprisingly found that, for use with certain low GWP refrigerants by increasing the viscosity of the lubricant to have the same or similar viscosity as that of mineral oil, which is at or about 70 cSt to at or about 100 cSt at 40° C. or at or about 10 cSt to at or about 12.6 cSt at 100° C., and preferably between at or about 90 cSt and 100 cSt at 40° C., and nominally 90 cSt at 40° C., to provide the tribofilm, the premature bearing failure was at least partially mitigated and/or prevented.

Applications of the lubricant blends herein can include vapor compression systems that employ a centrifugal compressor, a screw compressor, a scroll compressor, or reciprocating compressor, which may be used in a fixed or variable speed operation. The lubricant blends herein may be mixed with a refrigerant or refrigerant blend, including two or more of saturated hydrofluorocarbon, unsaturated hydrofluorocarbon, saturated hydrofluorochlorocarbon, unsaturated hydrofluorochlorocarbon, hydrocarbon, fluorinated or nonfluorinated ether, carbon dioxide, and ammonia.

In an embodiment, such refrigerants can include but are not limited to at least one of or blends of 1,1-dichloro-2,2,2-difluoroethane, 1,1,1,2-tetrafluoroethane, 1,1,1,3,3-pentafluoropropane, 1,1,2,2,3-pentafluoropropane, difluoromethane, 1,1-difluoroethane, 1,2-dichloroethylene (E), 1,2-dichloroethylene (Z), 1,1-dichloroethylene, 1,1,1,4,4,4-hexafluorobutene (Z), 1,1,1,4,4,4-hexafluorobutene (E), 1,1,1,2,3-pentafluoropropane, 1,1,1,3,3-pentafluoropropane, C2-C8 hydrocarbons, carbon dioxide, and ammonia, and combinations thereof. In an embodiment, the POE/AB lubricant blend is not used with trans-1-chloro-3,3,3-trifluoropropene (R1233zd) since R1233zd likely has higher solubility in a POE oil than a typical mineral oil.

In yet another embodiment, the lubricant can include or be mixed with additives when used with the low GWP refrigerant. In an embodiment, the additives can include one or more of dispersants, detergents, anti-wear additives, pressure agents, corrosion inhibitors, antioxidants, acid catchers, viscosity index improvers, pour point depressants, foaming agents, anti-foaming agents, or other like stabilizing or performance enhancing compounds. More preferably, the additives include the combination of the anti-wear additives, the corrosion inhibitor additives, the antioxidant additives, and the acid catching additives.

It is appreciated that the anti-wear additives include triaryl phosphates, which is a lubricity improvement additive and refrigerant stabilizer, the corrosion inhibitor additives include benzotriazole, which is a yellow metal passivator, lubricity improvement additive, and refrigerant stabilizer, the antioxidant additives include butylated hydroxytoluene, which is a free radical scavenger, antioxidant, and refrigerant stabilizer, and the acid catching additives include 2-ethylhexyl glycidyl ether, which is an acid scavenger and refrigerant stabilizer, as summarized in Table 1 below.

TABLE 1

| | PURPOSE | METHOD | Structure |
|---|---|---|---|
| Triaryl phosphates (TAP) | Anti-Wear | Forms phosphate deposit on surface | TAP |
| Butylated hydroxytoluene (BHT) | Anti-Oxidant | | BHT |
| 2-ethylhexyl glycidyl ether (AC) | Acid Catcher | Ties up Cl– | AC |

TABLE 1-continued

| | PURPOSE | METHOD | Structure |
|---|---|---|---|
| Benzotriazole (BZT) | Corrosion Inhibitor | Coats metalic surfaces. | 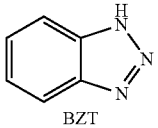 BZT |

Furthermore, the additives can be present in the lubricant blend at or about 1 to at or about 5 mass % with respect to the mass of the lubricant. Specifically, TAP can be present in an amount between at or about 0.5% to at or about 4 mass %, and preferably at 2 mass %, BZT can be present in an amount at or about 20 ppm to at or about 1000 ppm, and preferably 90 ppm, 2-ethylhexyl glycidyl ether (AC) can be present in an amount at or about 250 ppm to at or about 5000 ppm, and preferably, 900 ppm, and BHT can be present in an amount at or about 250 ppm to at or about 5000 ppm, and preferably, 1000 ppm.

It is appreciated that the various embodiments as discussed herein can be combined to provide unexpected improvements in the properties. For example, since the above mentioned failure mechanism was not experienced with the refrigerant R-123 in combination with the mineral oil based lubricant, such combination of various embodiments have unexpectedly improved properties, and specifically, at the critical ranges, as disclosed herein. For example, in an embodiment the wear-resistant sleeve-like coating can be applied to the compressor shaft to increase shaft hardness and improve resistance to chemical reactions. In another embodiment, the lubricant is selected to have a viscosity at or about 90 to at or about 100 cSt, and nominally 90 cSt at 40° C., which allowed the compressor to have an improved operating clearance between the moving and/or non-moving parts, e.g., the shaft and journal bearing and the shaft and shaft seals which, for example, to allow smaller sized debris to pass through the operating clearances. Moreover, when the additives were provided in the lubricant at the concentrations, as disclosed herein, the lubricant provided anti-wear protection while reducing chemical reactions from occurring at the wear surfaces, e.g., at the journal bearing location or seal location. Furthermore, when the compressor included the wear-resistant sleeve-like treatment, e.g., the chromium oxide (ceramic) wear sleeve, along with the use of a higher viscosity oil and the additives, at the critical ranges discussed herein, it was surprisingly found that such combination of features provided the required protection against system debris and oil breakdown for continued operation of the compressor, e.g., mitigated and/or prevented wear of the system.

Example: Preparation of Centrifugal Compressor Having Wear-Resistant Sleeve-Like Treatment A carbon steel sleeve, which can be a 1026, 1045, or 4140 material, was prepared for installation on a compressor shaft. The carbon steel sleeve was cylindrical and machined to be a shrink fit design to at or about 0.002 to at or about 0.005" interference fit to withstand temperature gradients. The sleeve was then sprayed to have a hard coating layer, for example, chromium oxide, to provide high hardness and protection against wear. The wear-resistant sleeve had a total wall thickness at or around 0.5 inches with an at or about 0.015 inch ceramic chromium oxide layer.

The portions of the compressor shaft that experiences the abrasive wear was determined, e.g., portion adjacent or at the location of the journal bearing and/or labyrinth seal, and the portion of the compressor shaft was treated, e.g., ground or etched, such that when the sleeve was heated to a temperature to allow thermal expansion, the sleeve was fit over the compressor shaft at the selected portion(s). The sleeve was then cooled to room temperature and ground to match the outer surface of the compressor shaft.

As such the portion of the compressor shaft having the wear-resistant treatment had improved chemical resistance and high hardness, e.g., between at or about 60 to at or about 70 HRC.

A hard chrome sleeve was also prepared in a similar manner on a carbon steel sleeve, as discussed above. The resulting wear-resistant treatment was also found to have improved chemical resistant and high hardness, e.g., between at or about 80 to at or about 90 HRC.

Example: Lubricant Blend Used with Centrifugal Compressor

Different lubricant blends were evaluated to increase the lubricant viscosity to obtain improved operating clearances between the compressor shaft and the bearings. As seen in Table 2, the blends were modified so that the operating viscosity of the lubricant was matched to the operating viscosity of the R123/mineral oil mixture. For example, the POE was increased to 85% to 90%, with the remainder being AB and/or additives. The 90/10 ratio had a viscosity that met or exceeded the R123/mineral oil mixture, while the 85/15 ratio had a similar but lower viscosity.

TABLE 2

| Target | Est. Actual % POE Oil | Pure Oil Viscosity at 40 C. (cSt) | Pure Oil Viscosity at 100 C. (cSt) |
|---|---|---|---|
| 80/20 | 80% | ~56 (estimated) | ~7 (estimated) |
| 85/15 | 83.5-85% | 71-76 | 10.0-10.5 |
| 90/10 | 90-91% | 97-100 | 12.1-12.6 |

Example: Additives

Different additive concentrations were used in the lubricant to evaluate the lubricant/additive(s) that had the least amount of reactivity with the common chiller materials, e.g., copper, steel, aluminum, and bearing Babbitt. By changing additive concentrations in the samples shown below, the preferred additive concentration was determined based on, for example, a criteria selected from at least one of the total acid number, amount of fluoride, the amount of chloride, the dissolved elements, or a combination thereof.

| Sample Description | Metals | Total Acid Number mg KOH/g Oil | Fluoride ppm | Chloride ppm | Dissolved Elements (ppm) | | | | |
|---|---|---|---|---|---|---|---|---|---|
| | | | | | Al | Fe | Cu | Sn | P |
| Sample 1 | 127° C., Babbitt | <0.05 | <5 | <5 | <3 | <1 | <1 | <1 | NA |
| Sample 2 | 1 week Babbitt | <0.05 | <5 | <5 | <3 | <1 | <1 | <1 | 2638 |
| Sample 3 | Babbitt | <0.05 | <5 | 9 | <3 | <1 | <1 | <1 | 1763 |
| Sample 4 | Babbitt | <0.05 | <5 | <5 | <3 | <1 | <1 | <1 | 1843 |
| Sample 1 | 175° C., Babbitt | 0.76 | <5 | 54 | <3 | <1 | <1 | 95 | NA |
| Sample 2 | 1 week Babbitt | 0.21 | <5 | <5 | <3 | <1 | <1 | 36 | 2488 |
| Sample 3 | Babbitt | 0.16 | <5 | <5 | <3 | <1 | <1 | 65 | 1469 |
| Sample 4 | Babbitt | 0.05 | <5 | <5 | 3 | <1 | <1 | 13 | 1418 |

A preferred embodiment of the additives used with lubricant is provided below in Table 3.

TABLE 3

| ID# Base Oil | | Example 1 Base Oil 1 | Example 2 Base Oil 1 | Example 3 Base Oil 2 |
|---|---|---|---|---|
| Surface Active | Antiwear | 2% TAP | 2% TAP | 2% TAP |
| | Corrosion Inhibitor | | 90 ppm BZT | 90 ppm BZT |
| Bulk Protective | Antioxidant | 1000 ppm BHT | 1000 ppm BHT | 1000 ppm BHT |
| | Acid Catcher | | 900 ppm AC | 900 ppm AC |

That is, triaryl phosphate is provided at 2% since it reacts with metal surfaces to improve load carrying capability. 2-ethylhexyl glycidyl ether is provided at 900 ppm to reduce the impact and/or presence of any reactive species that could be present due to oil breakdown. Butylated hydroxytoluene is provided at 1000 ppm to reduce the impact and/or presence of any reactive species that could be present due to oil breakdown. Finally, benzotriazole is provided at 90 ppm to drive passivation of metal surfaces.

Aspects

Any one or more of aspects 1 to 13 may be combined with any one or more of aspects 14 to 18, and vice versa.

Aspect 1: A compressor, comprising a housing; a shaft configured to be rotated relative to the housing to compress a refrigerant; a motor configured to drive the shaft; a lubrication system configured to supply lubricant to the compressor; and a bearing configured to support the shaft, wherein the shaft comprises a wear-resistant sleeve-like treatment on at least a portion of an outer surface of the shaft adjacent the bearing, and wherein the lubricant is a lubricant blend composition comprising two or more lubricants, the two or more lubricants including a first lubricant; and a second lubricant, wherein the first lubricant is present at a higher volume percentage than the second lubricant, and the first lubricant includes a higher viscosity than the second lubricant.

Aspect 2. The compressor according to Aspect 1, wherein the wear-resistant sleeve-like treatment is a coating selected from at least one of hard chrome, chromium oxide, aluminum oxide, cobalt/chromium carbide, boron nitride, CoNiCrAlY, NiCoCrAlY, complex carbides in nickel rich matrix, tungsten carbides in cobalt rich matrix (ExoGard), graphite, molybdenum, tungsten, diamond-like carbon, nickel alloy, hardened steel, or a combination thereof.

Aspect 3. The compressor according to Aspect 2, wherein the wear-resistant sleeve-like treatment is a coating of hard chrome or chromium oxide, and preferably, chromium oxide.

Aspect 4. The compressor according to any of Aspects 1-3, wherein the wear-resistant sleeve-like treatment is a carbon steel sleeve having a hard chromium or chromium oxide coating, wherein the hard chromium or the chromium oxide coating has a thickness between at or about 0.005 and at or about 0.05 inches and the carbon steel sleeve has a wall thickness between at or about 0.2 inches and at or about 0.7 inches.

Aspect 5. The compressor according to any of Aspects 1-4, wherein the first lubricant is polyol ester (POE) or a polyvinyl ether (PVE) and the second lubricant is alkylbenzene (AB) or mineral oil.

Aspect 6. The compressor according to Aspect 5, wherein the lubricant has a viscosity of at least 70 centistokes at 40° C., and at least 10 centistokes at 100° C.

Aspect 7. The compressor according to Aspect 6, wherein the lubricant has a viscosity between at or about 90 centistokes and at or about 100 centistokes at 40° C., and between at or about 12 centistokes and at or about 12.6 centistokes at 100° C.

Aspect 8. The compressor according to any of Aspects 1-7, wherein the lubricant comprises additives, wherein the additives include at least one of anti-wear additives, corrosion inhibitor additives, antioxidant additives, acid catching additives, or a combination thereof.

Aspect 9. The compressor according to Aspect 8, wherein the lubricant comprises the anti-wear additives, the corrosion inhibitor additives, the antioxidant additives, and the acid catching additives, wherein the anti-wear additives include triaryl phosphates, the corrosion inhibitor additives include benzotriazole, the antioxidant additives include butylated hydroxytoluene, and the acid catching additives include 2-ethylhexyl glycidyl ether.

Aspect 10. The compressor according to Aspect 8, wherein the lubricant comprises between at or about 0.5 and at or about 4 mass % of the anti-wear additives; between at or about 20 and at or about 1000 ppm of the corrosion inhibitor additives; between at or about 250 and at or about 5000 ppm of the antioxidant additives; and between at or about 250 and at or about 5000 ppm of the acid catching additives.

Aspect 11. The compressor according to Aspect 8, wherein the lubricant comprises between at or about 85 and at or about 95 volume % polyol ester (POE), between at or about 5 and at or about 15 volume % alkylbenzene (AB), and between at or about 1 and at or about 5 mass % additives.

Aspect 12. The compressor according to any of Aspects 1-11, wherein the refrigerant is a hydrofluoroolefin (R514A) based refrigerant.

Aspect 13. The compressor according to any of Aspects 1-12, further comprising a seal configured to prevent the compressed gas from flowing to the motor along the shaft, wherein the shaft further comprises the wear-resistant sleeve-like treatment on at least a portion of the outer surface of the shaft adjacent the seal.

Aspect 14. A method of retrofitting a compressor, comprising: coating a sleeve for a shaft of the compressor according to any of Aspects 1-13 to provide a wear-resistant coating; and interference fitting the sleeve on the shaft of the compressor by heating the sleeve and fitting the sleeve over the shaft.

Aspect 15. The method according to Aspect 14, wherein the wear-resistant coating is provided by spray coating, preferably by plasma spraying.

Aspect 16. The method according to any of Aspects 14-15, wherein the method further comprises cooling the sleeve and grinding the sleeve for fitting on the shaft.

Aspect 17. The method according to any of Aspects 14-16, wherein the wear-resistant coating comprises a coating selected from at least one of hard chrome, chromium oxide, aluminum oxide, cobalt/chromium carbide, boron nitride, CoNiCrAlY, NiCoCrAlY, complex carbides in nickel rich matrix, tungsten carbides in cobalt rich matrix (ExoGard), graphite, molybdenum, tungsten, diamond-like carbon, nickel alloy, hardened steel, or a combination thereof.

Aspect 18. The method according to Aspect 17, wherein the sleeve comprises carbon steel and chromium oxide is sprayed on an outer surface of the sleeve to provide the wear-resistant coating.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the aspects and claims.

The invention claimed is:

1. A compressor, comprising:
a housing;
a shaft configured to be rotated relative to the housing to compress a refrigerant, wherein the refrigerant is a low global warming potential refrigerant;
a motor configured to drive the shaft;
a lubrication system configured to supply lubricant to the compressor; and
a bearing configured to support the shaft,
wherein the shaft comprises a wear-resistant sleeve-like treatment on at least a portion of an outer surface of the shaft adjacent the bearing, and
wherein the lubricant is a lubricant blend composition comprising two or more lubricants, the two or more lubricants including a first lubricant; and a second lubricant, wherein the first lubricant is present at a higher volume percentage than the second lubricant, and the first lubricant includes a higher viscosity than the second lubricant and additives, wherein the additives include at least one of anti-wear additives, corrosion inhibitor additives, antioxidant additives, acid catching additives, or a combination thereof.

2. The compressor according to claim 1, wherein the wear-resistant sleeve-like treatment is a coating selected from at least one of hard chrome, chromium oxide, aluminum oxide, cobalt/chromium carbide, boron nitride, CoNiCrAlY, NiCoCrAlY, complex carbides in nickel rich matrix, tungsten carbides in cobalt rich matrix (ExoGard), graphite, molybdenum, tungsten, diamond-like carbon, nickel alloy, hardened steel, or a combination thereof.

3. The compressor according to claim 2, wherein the wear-resistant sleeve-like treatment is a coating of hard chrome or chromium oxide.

4. The compressor according to claim 1, wherein the wear-resistant sleeve-like treatment is a carbon steel sleeve having a hard chrome or chromium oxide coating, wherein the hard chrome or the chromium oxide coating has a thickness between at or about 0.005 and at or about 0.05 inches and the carbon steel sleeve has a wall thickness between at or about 0.2 inches and at or about 0.7 inches.

5. The compressor according to claim 1, wherein the first lubricant is polyol ester (POE) or a polyvinyl ether (PVE) and the second lubricant is alkylbenzene (AB) or mineral oil.

6. The compressor according to claim 1, wherein the lubricant has a viscosity of at least 70 centistokes at 40° ° C., and at least 10 centistokes at 100° C.

7. The compressor according to claim 6, wherein the lubricant has a viscosity between at or about 90 centistokes and at or about 100 centistokes at 40° ° C., and between at or about 12 centistokes and at or about 12.6 centistokes at 100° C.

8. The compressor according to claim 1, wherein the lubricant comprises the anti-wear additives, the corrosion inhibitor additives, the antioxidant additives, and the acid catching additives, wherein the anti-wear additives include triaryl phosphates, the corrosion inhibitor additives include benzotriazole, the antioxidant additives include butylated hydroxytoluene, and the acid catching additives include 2-ethylhexyl glycidyl ether.

9. The compressor according to claim 1, wherein the lubricant comprises between at or about 0.5 and at or about 4 mass % of the anti-wear additives; between at or about 20 and at or about 1000 ppm of the corrosion inhibitor additives; between at or about 250 and at or about 5000 ppm of the antioxidant additives; and between at or about 250 and at or about 5000 ppm of the acid catching additives.

10. The compressor according to claim 1, wherein the lubricant comprises between at or about 85 and at or about 95 volume % polyol ester (POE), between at or about 5 and at or about 15 volume % alkylbenzene (AB), and between at or about 1 and at or about 5 mass % additives.

11. The compressor according to claim 1, further comprising a seal configured to prevent the compressed gas from flowing to the motor along the shaft, wherein the shaft further comprises the wear-resistant sleeve-like treatment on at least a portion of the outer surface of the shaft adjacent the seal.

12. A method of retrofitting a compressor, the compressor, comprising a housing, a shaft configured to be rotated relative to the housing to compress a refrigerant, a motor configured to drive the shaft, a lubrication system configured to supply lubricant to the compressor, and a bearing configured to support the shaft, wherein the shaft comprises a wear-resistant sleeve-like treatment on at least a portion of an outer surface of the shaft adjacent the bearing, and wherein the lubricant is a lubricant blend composition comprising two or more lubricants, the two or more lubricants including a first lubricant; and a second lubricant, wherein the first lubricant is present at a higher volume percentage than the second lubricant, and the first lubricant includes a higher viscosity than the second lubricant, the method comprising:

coating a sleeve for the shaft of the compressor to provide a wear-resistant coating; and interference fitting the sleeve on the shaft of the compressor by heating the sleeve and fitting the sleeve over the shaft.

13. The method according to claim 12, wherein the wear-resistant coating is provided by spray coating.

14. The method according to claim 12, wherein the method further comprises cooling the sleeve and grinding the sleeve for fitting on the shaft.

15. The method according to claim 12, wherein the wear-resistant coating comprises a coating selected from at least one of hard chrome, chromium oxide, aluminum oxide, cobalt/chromium carbide, boron nitride, CoNiCrAlY, NiCoCrAlY, complex carbides in nickel rich matrix, tungsten carbides in cobalt rich matrix (ExoGard), graphite, molybdenum, tungsten, diamond-like carbon, nickel alloy, hardened steel, or a combination thereof.

16. The method according to claim 13, wherein the sleeve comprises carbon steel and chromium oxide is sprayed on an outer surface of the sleeve to provide the wear-resistant coating.

\* \* \* \* \*